Dec. 18, 1934.　　　P. H. HENKEL　　　1,984,927
BAG
Filed July 28, 1932

Paul H. Henkel
INVENTOR.

BY
ATTORNEYS.

Patented Dec. 18, 1934

1,984,927

UNITED STATES PATENT OFFICE 1,984,927

BAG

Paul H. Henkel, Erie, Pa., assignor to Continental Rubber Works, Erie, Pa., a corporation of Pennsylvania Application July 28, 1932, Serial No. 625,507

4 Claims. (Cl. 150—1)

Many commodities, such as fine powders, require bags that are practically impervious, of sufficient strength to permit of convenient handling and with many products a bag formed of material resistant to the destructive action of the included material. According to the present invention the bag is formed of rubber. It is re-enforced and sealed along the bottom by uniting the sides along the bottom and folding the same. It is made more or less non-yielding so as to prevent undue distortion by forming the bag of united plies of rubber with cross grains. Features and details of the invention will appear from the specification and claims.

Preferred embodiments of the invention are illustrated in the accompanying drawing as follows:—

Figure 1:
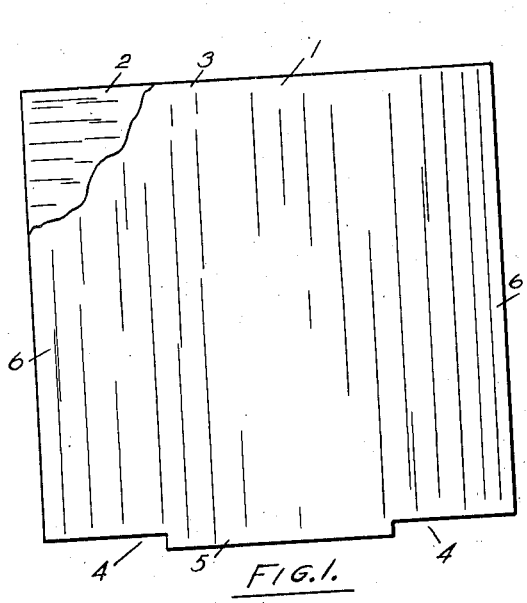

Fig. 1 shows an elevation of the rubber sheet prior to folding and forming into a bag.

Figure 2:
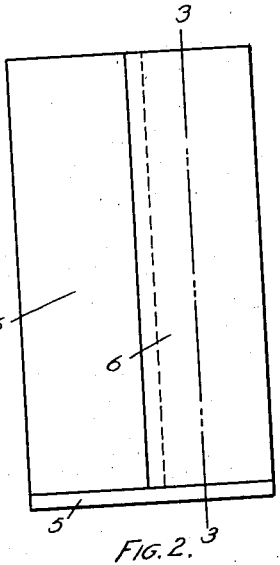

Fig. 2 an elevation of the completed bag.

Figure 3:
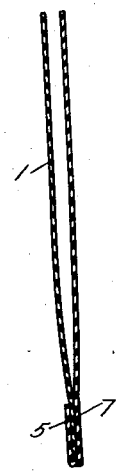

Fig. 3 a section on the line 3—3 in Fig. 2.

Figure 4:
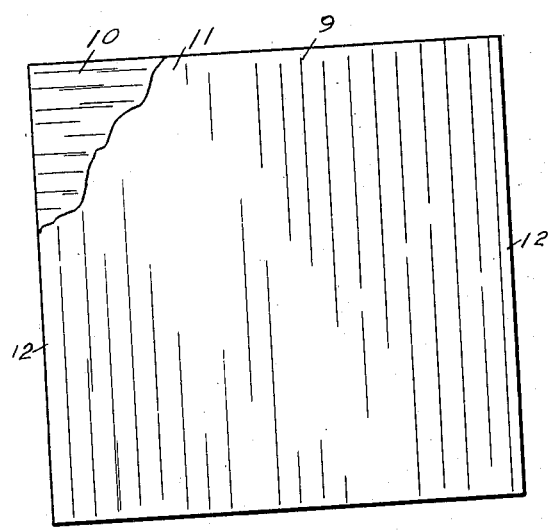

Fig. 4 an elevation of a rubber sheet from which a modified bag is formed.

Figure 5:
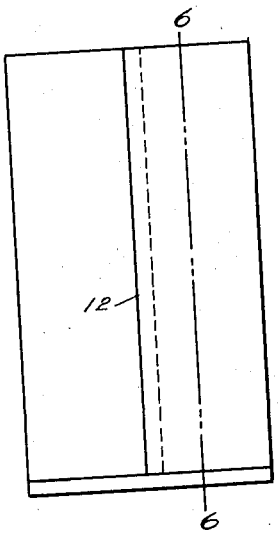

Fig. 5 an elevation of the completed bag.

Figure 6:
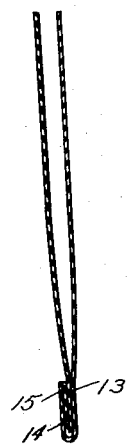

Fig. 6 a section on the line 6—6 in Fig. 5.

In the structure shown in Figs. 1 to 3, a rubber sheet 1 is formed of plies 2 and 3 with the grain of the rubber of one ply crosswise to that of the rubber of the other ply. This rubber is preferably formed by calendering a sheet, separating it at intervals corresponding to the width of the sheet, as 1, and taking the sections, turning them and uniting the sides, so that the united sections will form a strip with the grain of the rubber crosswise of the strip. Another ply of rubber can be calendered on to this strip giving to the latter ply a grain lengthwise of the strip and crosswise of the grain of the first-mentioned ply. The sheet has portions at each side of the bottom cut out at 4 leaving a flap 5. The two edges 6 of the sheet are folded over and overlapped and rolled down. The flap 5 is then turned up and rolled down along its strip. Preferably the walls of the two sides are prevented from uniting by the insertion of paper to which the rubber will not adhere. The bottom edge of this paper terminates slightly above the bottom of the finished bag and consequently the inner surfaces of the two side walls along a strip at the bottom are united at 7. The flap 5 is then folded against the outer surface of the opposite side from which the flap extends and united with the outer surface of said opposite side. With the parts in this condition, the bag is vulcanized ordinarily by placing the bags in piles properly insulated, one from another, and the several piles run into a vulcanizer and vulcanized. With a bag of this form the cross grain plies resist undue expansion in either direction and to some extent add to the ultimate strength of the bag. The uniting of the two sides for a slight distance up from the bottom of the bag adds to the assurance of a closure along the bottom, particularly near the edges of the sides and forming the fold in a single flap gives the necessary re-enforcement without undue thickness.

In the structure shown in Figs. 4, 5 and 6, the bag is formed from a sheet 9 having the cross grain plies 10 and 11. The edges 12 are folded over and overlapped, as shown in Fig. 5, and both side walls along the bottom are folded up, the inner surfaces of the sides being united at 13, the surfaces of the side receiving the fold being united at 14 and the portion of the two sides contained in the fold being united at 15. This gives added re-enforcement, but adds to the bulk of the seam. The vulcanizing is accomplished in the same manner as with the structure illustrated in Fig. 2.

What I claim as new is:—

1. A bag having vulcanized rubber walls, the inner surfaces of the sides thereof being vulcanized together in a strip along the bottom.

2. A bag having vulcanized rubber walls having the inner surfaces of the walls of the sides vulcanized together in a strip along the bottom and having a side extending from the bottom of the strip folded over and vulcanized together with the outer surface of the opposite side.

3. A bag having vulcanized rubber walls having the inner surfaces of the walls of the sides vulcanized together in a strip along the bottom and having one only of the sides extended beyond the opposite side and folded against and vulcanized together with the outer surface of said opposite side.

4. A bag having vulcanized rubber walls having the inner surfaces of the walls of the sides vulcanized together in a strip along the bottom and having both sides extended beyond the strip and folded against and vulcanized together with the outer surface of one of the sides.

PAUL H. HENKEL.